United States Patent
Neal, Jr. et al.

(10) Patent No.: US 11,861,509 B2
(45) Date of Patent: Jan. 2, 2024

(54) AUTOMATED POSITIVE TRAIN CONTROL EVENT DATA EXTRACTION AND ANALYSIS ENGINE FOR PERFORMING ROOT CAUSE ANALYSIS OF UNSTRUCTURED DATA

(71) Applicant: BNSF Railway Company, Fort Worth, TX (US)

(72) Inventors: Scott Alan Neal, Jr., Fort Worth, TX (US); Siju Pallimolel Kuriakose, Bedford, TX (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 17/721,311

(22) Filed: Apr. 14, 2022

(65) Prior Publication Data

US 2023/0334340 A1    Oct. 19, 2023

Related U.S. Application Data

(63) Continuation-in-part of application No. 17/721,204, filed on Apr. 14, 2022, now Pat. No. 11,541,919.

(51) Int. Cl.
*G06N 5/022*    (2023.01)
*G06N 5/01*    (2023.01)

(52) U.S. Cl.
CPC ............... *G06N 5/022* (2013.01); *G06N 5/01* (2023.01)

(58) Field of Classification Search
CPC .......... G06N 20/10; G06N 20/20; G06N 3/02; G06N 3/08; G06N 5/003; G06N 7/005;
(Continued)

(56) References Cited

U.S. PATENT DOCUMENTS 8,082,071 B2    12/2011    Daum et al.
9,796,400 B2    10/2017    Puttagunta et al.
(Continued)

FOREIGN PATENT DOCUMENTS

EP    3254928 A1    12/2017
EP    3753801 A1    12/2020
WO    2020205684 A1    10/2020

OTHER PUBLICATIONS

"Positive Train Control With Dynamic Headway Based on an Active Communication System" Zhao et al (Year: 2015).*
(Continued)

*Primary Examiner* — Luis A Sitiriche
(74) *Attorney, Agent, or Firm* — Whitaker Chalk Swindle & Schwartz, PLLC; Enrique Sanchez, Jr.

(57) ABSTRACT

A system and method for performing root cause analysis for enforcement events is presented. The system can enable accurate detection of an enforcement event and identifies the root cause of such events. The system can enable accurate detection of the enforcement event and identifies the root cause of such events using an automation workflow engine. The system can perform root cause analysis based on at least one analysis model. The system can provide a user with an interface to monitor the enforcement event by collecting a list of data points characterizing the enforcement event, as well as analyze the data points to evaluate what is the root cause of the enforcement event.

24 Claims, 5 Drawing Sheets

(58) Field of Classification Search
CPC .. B60T 17/228; B60T 8/1705; B61L 15/0072; B61L 15/0081; B61L 2205/04; B61L 23/041; B61L 25/025; B61L 27/04; B61L 15/009; B61L 23/042; B61L 23/34; B61L 25/04; B61L 27/16; B61L 27/18; B61L 27/40; B61L 27/57; B61L 27/60; B61L 3/006

See application file for complete search history.

(56) References Cited

U.S. PATENT DOCUMENTS

| | | | |
|---|---|---|---|
| 10,077,033 | B2 | 9/2018 | Oswald et al. |
| 11,538,076 | B1* | 12/2022 | McCormick ............ G06N 20/00 |
| 2008/0263436 | A1* | 10/2008 | Ahrens .................... H04L 67/63 |
| | | | 715/234 |
| 2012/0143795 | A1* | 6/2012 | Han ....................... G06F 11/079 |
| | | | 714/E11.029 |
| 2014/0218482 | A1 | 8/2014 | Prince |
| 2015/0347214 | A1* | 12/2015 | Samuni ............... G06F 11/0751 |
| | | | 714/37 |
| 2016/0077650 | A1* | 3/2016 | Durojaiye ............. G06F 3/0488 |
| | | | 345/173 |
| 2016/0194012 | A1* | 7/2016 | Matthews ............. B61L 23/044 |
| | | | 246/121 |
| 2017/0154292 | A1* | 6/2017 | Venkataraman ............................ G06Q 10/063114 |
| 2018/0339719 | A1 | 11/2018 | Loughlin |
| 2021/0107539 | A1 | 4/2021 | Howard et al. |
| 2022/0194440 | A1 | 6/2022 | Akif et al. |

OTHER PUBLICATIONS

"Root Cause Identification of Power System Faults using Waveform Analytics" Mahfuz Ali Shuvra et al (Year: 2018).*

Enterprise Integration, the Solution to Your PTC False Positive Enforcement Problem, Dec. 31, 2019.

Placencia, Reviewing the Use of Proactive Data Analysis in Developing Rail Safety Culture, Dec. 31, 2016.

Brown, Text Mining the Contributors to Rail Accidents, Feb. 29, 2016.

Alawad et al., Wireless Sensor Networks: Toward Smarter Railway Stations, Jul. 17, 2018.

Zhang et al., Positive Train Control (PTC) for railway safety in the United States: Policy developments and critical issues, Dec. 31, 2018.

Hann, Incremental Train Control System, IEEE Vehicular technology magazine, Dec. 2010, pp. 50-55.

Smallcombe, Using Regular Expressions in Big Data, Integrate.io, Sep. 28, 2020.

Wen et al., Train Dispatching Management With Data-Driven Approaches: A Comprehensive Review and Appraisal, IEEE Access, Aug. 29, 2019, pp. 114547-114571, vol. 7.

Chowdhury et al., Regular Expressions in Big Data Analytics, 2017 International Conference on Intelligent Computing and Control (I2C2), 2017, IEEE.

International Patent Application No. PCT/US2023/016825 International Search Report and Written Opinion, 15 pages, dated Jul. 10, 2023.

* cited by examiner

AUTOMATED POSITIVE TRAIN CONTROL EVENT DATA EXTRACTION AND ANALYSIS ENGINE FOR PERFORMING ROOT CAUSE ANALYSIS OF UNSTRUCTURED DATA

CROSS-REFERENCE TO RELATED APPLICATIONS

The present application is a Continuation-in-Part of U.S. patent application Ser. No. 17/721,204, filed Apr. 14, 2022, entitled "AUTOMATED POSITIVE TRAIN CONTROL EVENT DATA EXTRACTION AND ANALYSIS ENGINE AND METHOD THEREFOR," the entirety of which is hereby incorporated by reference for all purposes.

TECHNICAL FIELD

The present disclosure relates generally to performing root cause analysis for railroad events, and more particularly to systems and methods for automating workflow and performing root cause analysis for unstructured data structures of a fleet of trains.

BACKGROUND

Positive Train Control (PTC) systems can generate braking events related to train operation. When a train is in danger of exceeding its authority or going over speed, it initiates a penalty application stopping the train, known as a brake event. Generally, determining the root cause of an event enforcing a locomotive to stop is a time-consuming task. Each brake event typically had to be manually reviewed to determine the root cause of the event. This manual review could take hours or days to determine the cause.

Managing a fleet of trains is a complex system of systems. The mechanical and electrical complexity of a fleet render root cause analysis impossible to rely on a single source of data to resolve a single enforcement event. Amplifying the complexity, organizations managing locomotives can become inundated by the volume of events that occur across the fleet considering the amount of time needed to resolve each enforcement event down to the root cause, write up a synopsis of the event, and send the synopsis to the appropriate personnel. Most enforcement events are resolved in approximately one hour using manual analysis to identify the root cause, but in some cases can even take more than a full day to resolve.

While existing organizational methods and personnel can be useful in identifying and managing root cause analyses about train events, inspection processes generally are still manual. For example, railroad personnel physically inspect the fleets and make the final decision as to the root cause of the enforcement event. Such personnel can misclassify events, require periodic training, and improperly document system component logs. Additionally, the root cause can result from a variety of factors such as a dropped signal, an issue with the train, a hardware or software issue, or from human error. With such a complex system of systems, manual inspection of a fleet is insufficient.

SUMMARY

The present disclosure achieves technical advantages as a system and method for performing root cause analysis in response to enforcement events given typically unstructured data. The system can enable accurate detection of an enforcement event and identifies the root cause of such events using an automation workflow engine. The system can provide a user with an interface to monitor the enforcement event by collecting a list of data points characterizing the enforcement event, as well as analyze the data points to evaluate what is the root cause of the enforcement event. The system can also extract critical information from system component logs of the train using an extraction model to generate a window of activity providing an analysis model with a comprehensive scope to analyze the enforcement event. Additionally, the system can give the user robust and accurate information of the root cause of the enforcement event.

The present disclosure solves the technological problem of analyzing data related to an enforcement event from disparate sources with unstructured data by, in one embodiment, providing an automated tool for identifying train events providing the root cause of an enforcement event in less time than manual inspection. An enforcement, for example, can include an event when a locomotive violates a safety policy triggering the system to force the locomotive to completely stop. Current root cause analysis procedures result in determining a resolution in hours or even days. The present disclosure surpasses conventional manual analysis of the train event by providing an automated solution by identifying a root cause using data analysis techniques in minutes or even seconds. The system also provides the benefit of simplifying the inspection process by providing only relevant information needed for a particular train event. Using this analysis provides a quicker solution to manual inspection minimizing any delays in train functionality, while also optimizing train event investigation time.

The present disclosure provides a technological solution missing from conventional systems via an extraction and analysis engine that can identify train events, retrieve train system logs, translate and transform structured and unstructured data into a predefined, standard format, perform root-cause analysis of PTC events, and notify subscribed users of the resolution. The extraction and analysis engine can implement one or more extraction models to identify the relevant data. The present disclosure provides for improved system performance through an extraction and analysis engine (and corresponding models) that can parse a plurality of PTC event-related files to retrieve only relevant details related to a particular PTC event, and implement a user-defined operational, scenario-based enforcement. Advantageously, an automated positive train control event data extraction and analysis engine and method is provided that can conduct a root cause analysis to determine the cause of PTC brake events without user interaction to alleviate the repetitive tasks involved in brake-event reporting. In another embodiment, the automated extraction model and automated analysis model can automatically (without user interaction) extract relevant log data and analyze brake event data using machine-learning algorithms. For example, the PTC event automation extraction/analysis engine can implement a natural language processing keyword detection algorithm to identify relevant information. Once the root cause is identified, the system can generate a detailed report for transmission to all event subscribers and close the event. Additionally, the system can categorize braking events for reporting purposes, escalate events for review, and provide in-depth brake event analysis. The system can also provide at least the following functionality:

Live or historical analysis;
    Multiple onboard software versions that can be processed in parallel;
    Solution tracking for problem resolution;
    Alerting;
    User subscriptions;
    Wide range of classification models;
    Continuous improvements;
    System reporting;
    High level classification; and
    Data retention.

The present disclosure technologically surpasses conventional manual analysis of the train event by providing an automated data extraction and analysis engine to efficiently identify relevant data in myriad log data and process the data to determine a root cause using data analysis techniques in minutes or even seconds, thereby minimizing train downtime. Accordingly, the present disclosure discloses concepts inextricably tied to computer technology such that the present disclosure provides the technological benefit of simplifying the data extraction and data analysis process by providing only the relevant information needed to identify and analyze a particular train event. Using this analysis provides a quicker solution to manual inspection minimizing any delays in train functionality, while also optimizing train event investigation time.

When an event occurs, the system can recognize the new events and downloaded the necessary logs. Once the logs are downloaded, decompressed, and stored in a directory for the system to begin processing, the event can be stored in a queue to execute on the next instantiation to begin processing and analyzing the event. The system can implement control logic, machine learning, and/or system services to verify the event time, identify the primary CPU during enforcement, verify the event occurred, determine the appropriate system component software version, and initiate a high-level system health scan to ensure the data is reliable to perform event analysis. Once completed and the event is cleared for processing, the system can select an appropriate extraction model to attain the appropriate data points. As software versions change and adapt, the additional extraction models are developed and presented for system selection upon at least partial event analysis. When the extraction model begins, all logs can be moved into a dictionary to give each row of log data a unique identifier. The extraction model can implement either prebuilt regular expressions or data manipulation practices (such as splitting) when compiling a delimited (structured) row to gain insight and valuable intel. Logs can be processed to normalize the data according to a uniform data structure. The system further allows the extraction of data points, the calculation of variables, and the creation of event time windows for the data.

In another embodiment, as priority data points are determined in the logs, the system can generate data points surrounding how the event occurred, and when the event occurred compared to the time of enforcement. These time windows can simulate how manual analysis is performed. For example, time windows can be seconds, minutes, or hours, and both positive or negative (occurring before or after) in relation to the time of enforcement.

The data can then be transformed and processed via one or more analysis models instantiated on one or more devices. In another embodiment, analysis models can be created using a variety of data science methods including Decision Tree, Classification, and Clustering, to name a few. Once a model is developed, the system can transform the model into customized algorithms that can be implemented by control logic, servers, processors, or other suitable devices. The analysis modes can be software specific and have a hierarchy. In another embodiment, defect analysis can be completed first. If a defect is found, the analysis can be concluded as the defect is identified as the cause of the main issue—not the response to the defect. Second, the events can be processed based on models created over time regarding engineer interactions, system component responses, and situational behavior, among others. The model can then be exited and a second (or subsequent) model instantiated with the data. If the second model does not agree with the first model, the system can determine the correct model, and close the event. For each model endpoint, e.g., in both models, a unique identifier can be created. The unique identifier allows the system to track and dynamically update the model endpoint from the backend by updating the database values for a specific unique identifier. In another embodiment, if no root cause is determined, the analysis model can create a high-level classification for the event by combining the target type, target description, and the last banner shown to the engineer prior to enforcement, among other parameters and values, thereby providing a user with some level of detail regarding the event without manual investigation.

In another embodiment, with the data retrieved from the extraction and analysis models, the system can create a detailed synopsis of the events leading up to enforcement, as well as the assigned root cause. These events include: time train went active, how fast the train was going at time of enforcement, location details, warnings that may have occurred, train configuration details, PTC component information, type of enforcement, type of braking, and others. Together, these data points can provide the benefit of allowing the end user to understand what transpired and how the system made its determination.

When the root cause is identified (or a high-level classification), the system can use the parameters from AES to determine who needs to be notified of the event, as well as the severity of the notification. If an alert is assigned to the analysis model identifier, then the appropriate railroad teams can receive an e-mail notifying them of additional steps to be taken immediately to reduce the chance of repeat offenses.

It is an object of the invention to provide a system for automating workflow and performing root cause analysis for data structures. It is a further object of the invention to provide a method of automating workflow and performing root cause analysis for data structures. It is a further object of the invention to provide a computer-implemented method for automating workflow and performing root cause analysis for data structures. These and other objects are provided by at least the following embodiments.

In one embodiment, a system for automating workflow and performing root cause analysis for data structures, comprising: a memory having a database with system component logs for determining a root cause; and a networked computer processor operably coupled to the memory and capable of executing machine-readable instructions to perform program steps, the program steps comprising: receiving extracted data; executing a first analysis model using the extracted data to generate a first result and assigning a first unique ID to the first result; if a defect is detected based on the first analysis model, classifying the defect as a root cause; if a defect is not detected based on the first analysis model, executing a second analysis model using the extracted data to generate a second result, assigning a second unique ID to the second result, and comparing the first result with the second result to determine a most accurate result as the root cause; generating a report to indicate the root cause; and storing the first result, the first unique ID, the second result, and the second unique ID. Wherein the first analysis model includes decision tree logic. Wherein the first analysis model includes a classification model. Wherein the first analysis model includes a clustering model. Wherein the second analysis model includes a historic analysis model based on historical data such as previous engineer interactions, system component responses, and situational behavior. Wherein the first analysis model includes a machine learning algorithm, or the second analysis model includes the machine learning algorithm. Wherein the program steps further comprise comparing the second result with historic classified data to determine an accuracy of the second result. Wherein the program steps further comprise determining the most accurate cause based on a user input.

In another embodiment, a method of automating workflow and performing root cause analysis for data structures, comprising: receiving extracted data; executing a first analysis model using the extracted data to generate a first result and assigning a first unique ID to the first result; if a defect is detected based on the first analysis model, classifying the defect as a root cause; if a defect is not detected based on the first analysis model, executing a second analysis model using the extracted data to generate a second result, assigning a second unique ID to the second result, and comparing the first result with the second result to determine a most accurate result as the root cause; generating a report to indicate the root cause; and storing the first result, the first unique ID, the second result, and the second unique ID. Wherein the first analysis model includes decision tree logic. Wherein the first analysis model includes a classification model. Wherein the first analysis model includes a clustering model. Wherein the second analysis model includes a historic analysis model based on historical data such as previous engineer interactions, system component responses, and situational behavior. Wherein the first analysis model includes a machine learning algorithm, or the second analysis model includes the machine learning algorithm. Wherein the program steps further comprise comparing the second result with historic classified data to determine an accuracy of the second result. Wherein the program steps further comprise determining the most accurate cause based on a user input.

In another embodiment, a computer-implemented method for automating workflow and performing root cause analysis for data structures, comprising: receiving extracted data; executing a first analysis model using the extracted data to generate a first result and assigning a first unique ID to the first result; if a defect is detected based on the first analysis model, classifying the defect as a root cause; if a defect is not detected based on the first analysis model, executing a second analysis model using the extracted data to generate a second result, assigning a second unique ID to the second result, and comparing the first result with the second result to determine a most accurate result as the root cause; generating a report to indicate the root cause; and storing the first result, the first unique ID, the second result, and the second unique ID. Wherein the first analysis model includes decision tree logic. Wherein the first analysis model includes a classification model. Wherein the first analysis model includes a clustering model. Wherein the second analysis model includes a historic analysis model based on historical data such as previous engineer interactions, system component responses, and situational behavior. Wherein the first analysis model includes a machine learning algorithm, or the second analysis model includes the machine learning algorithm. Wherein the program steps further comprise comparing the second result with historic classified data to determine an accuracy of the second result. Wherein the program steps further comprise determining the most accurate cause based on a user input.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. Pursuant to MPEP § 904, the Examiner, after having obtained a thorough understanding of the invention disclosed and claimed in the nonprovisional application has searched the prior art as disclosed in patents and other published documents, i.e., nonpatent literature. Therefore, as evidenced by the issuance of this patent, the prior art fails to disclose or teach the elements and limitations presented in the claims as enabled by the specification and drawings, such that the presented claims are patentable under 35 U.S.C. §§ 101, 102, 103, and 112.

Figure 1:
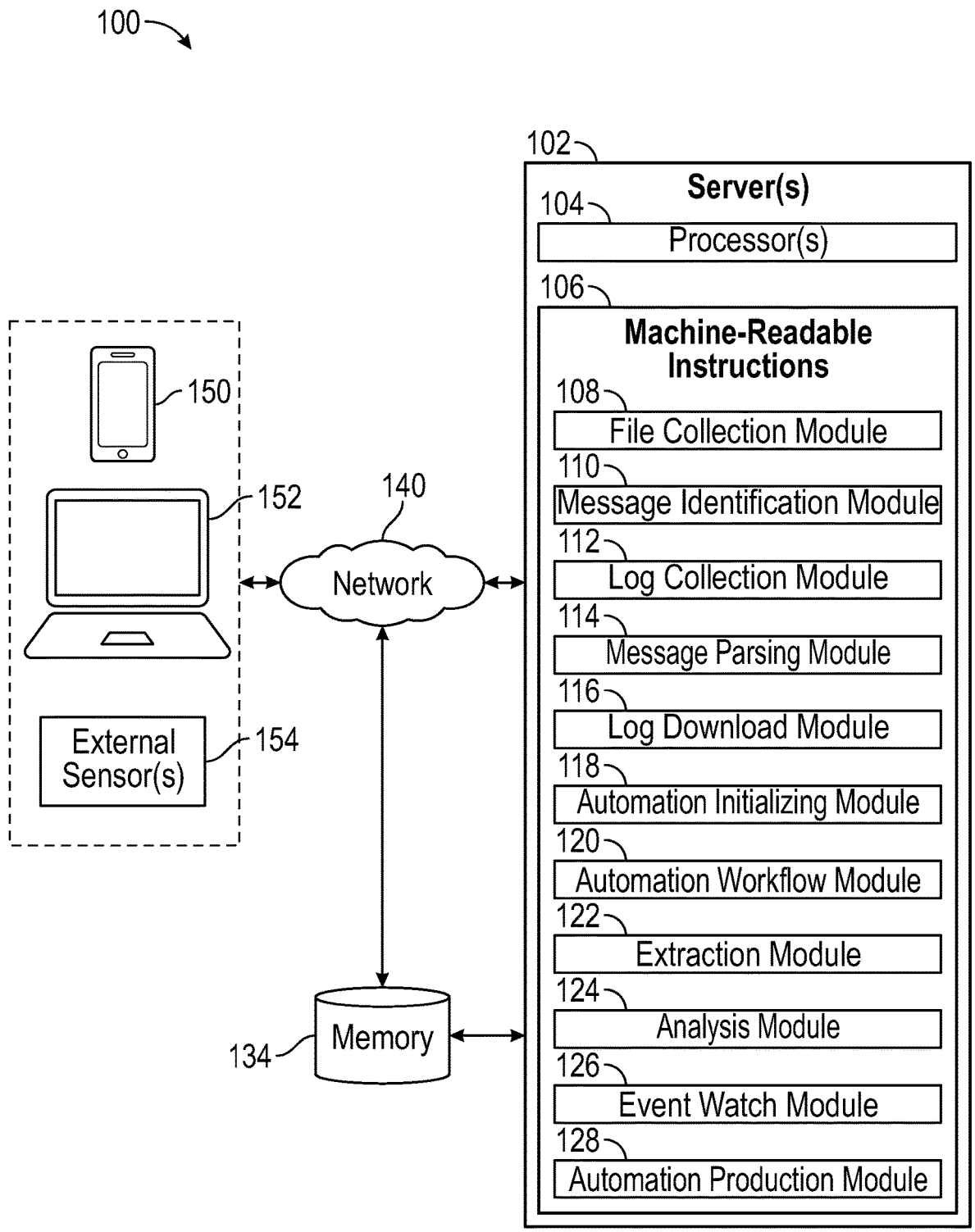
FIG. 1 illustrates an automated workflow system, in accordance with one or more embodiments of the present disclosure.

FIG. 1 illustrates a schematic view of an automated workflow system 100, in accordance with one or more embodiments of the present disclosure. The system 100 can include one or more servers 102 having one or more processors 104, a memory 134, machine readable instructions 106, including a file collection module 108, message identification module 110, log collection module 112, information parsing module 114, log download module 116, automation initializing module 118, automation workflow module 120, extraction module 122, analysis module 124, event watch module 126, and automation production module 128, among other relevant modules. The server 102 can be operably coupled to one or more clients via a network 140. The clients can be a physical device (e.g., mobile phone 150, laptop 152, external sensors 154, desktop computer, wearable device, or other suitable device), program, or application. In another embodiment, a client can include a mobile phone 150 having a mobile application configured to communicate with the server 102 over the network 140.

The aforementioned system components (e.g., server(s) 102 and client(s) 150, 152, 154, 156, etc.) can be communicably coupled to each other via the network 140, such that data can be transmitted. The network 140 can be the Internet, intranet, or other suitable network. The data transmission can be encrypted, unencrypted, over a virtual private network (VPN) tunnel, or other suitable communication means. The network 140 can be a wide area network (WAN), local area network (LAN), personal area network (PAN), or other suitable network type. The network communication between the clients, server 102, or any other system component can be encrypted using pretty good privacy (PGP), Blowfish, Twofish, triple data encryption standard (3DES), hypertext transfer protocol secure (HTTPS), or other suitable encryption. The system 100 can be configured to provide communication via the various systems, components, and modules disclosed herein via an application programming interface (API), peripheral component interface (PCI), PCI-Express, American National Standards Institute (ANSI)-X12, Ethernet, Wi-Fi, Bluetooth, or other suitable communication protocol or medium. Additionally, third party systems and databases can be operably coupled to the system components via the network 140.

The data transmitted to and from the components of system 100 (e.g., the server 102 and clients), can include any format, including JavaScript Object Notation (JSON), transfer control protocol (TCP)/internet protocol (IP), extensible markup language (XML), hypertext markup language (HTML), American Standard Code for Information Interchange (ASCII), short message service (SMS), comma-separated value (CSV), representational state transfer (REST), or other suitable format. The data transmission can include a message, flag, header, header properties, metadata, and/or a body, or be encapsulated and packetized by any suitable format having same.

The server(s) 102 can be implemented in hardware, software, or a suitable combination of hardware and software therefor, and may comprise one or more software systems operating on one or more servers, having one or more processors 104, with access to memory 134. Server(s) 102 can include electronic storage, one or more processors, and/or other components. Server(s) 102 can include communication lines, connections, and/or ports to enable the exchange of information via a network 140 and/or other computing platforms. Server(s) 102 can also include a plurality of hardware, software, and/or firmware components operating together to provide the functionality attributed herein to server(s) 102. For example, server(s) 102 can be implemented by a cloud of computing platforms operating together as server(s) 102, including Software-as-a-Service (SaaS) and Platform-as-a-Service (PaaS) functionality. Additionally, the server(s) 102 can include memory 134.

Memory 134 can comprise electronic storage that can include non-transitory storage media that electronically stores information. The electronic storage media of electronic storage can include one or both of system storage that can be provided integrally (e.g., substantially non-removable) with server(s) 102 and/or removable storage that can be removably connectable to server(s) 102 via, for example, a port (e.g., a Universal Serial Bus (USB) port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., erasable electronic programmable read only memory (EEPROM), random access memory (RAM), etc.), solid-state storage media (e.g., flash drive, etc.), and/or other electronically readable storage media. Electronic storage may include one or more virtual storage resources (e.g., cloud storage, a virtual private network, and/or other virtual storage resources). The electronic storage can include a database, or public or private distributed ledger (e.g., blockchain). Electronic storage can store machine-readable instructions 106, software algorithms, control logic, data generated by processor(s), data received from server(s), data received from computing platform(s), and/or other data that can enable server(s) to function as described herein. The electronic storage can also include third-party databases accessible via the network 140.

Processor(s) 104 can be configured to provide data processing capabilities in server(s) 102. As such, processor(s) 104 can include one or more of a digital processor, an analog processor, a digital circuit designed to process information, an analog circuit designed to process information, a state machine, and/or other mechanisms for electronically processing information, such as field programmable gate arrays (FPGAs) or application specific integrated circuits (ASICs). The processor(s) 104 can be a single entity or include a plurality of processing units. These processing units can be physically located within the same device, or processor(s) 104 can represent processing functionality of a plurality of devices or software functionality operating alone, or in concert.

The processor(s) 104 can be configured to execute machine-readable instructions 106 or machine learning modules via software, hardware, firmware, some combination of software, hardware, and/or firmware, and/or other mechanisms for configuring processing capabilities on processor(s) 104. As used herein, the term "machine-readable instructions" can refer to any component or set of components that perform the functionality attributed to the machine-readable instructions component 106. This can include one or more physical processors 104 during execution of processor-readable instructions, the processor-readable instructions, circuitry, hardware, storage media, or any other components.

The server(s) 102 can be configured with machine-readable instructions having one or more functional modules. The machine-readable instructions 106 can be implemented on one or more servers 102, having one or more processors 104, with access to memory 130. The machine-readable instructions 106 can be a single networked node, or a machine cluster, which can include a distributed architecture of a plurality of networked nodes. The machine-readable instructions 106 can include control logic for implementing various functionality, as described in more detail below. The machine-readable instructions 106 can include certain functionality associated with the system 100. Additionally, the machine-readable instructions 106 can include a smart contract or multi-signature contract that can process, read, and write data to the database, distributed ledger, or blockchain.

Figure 2:
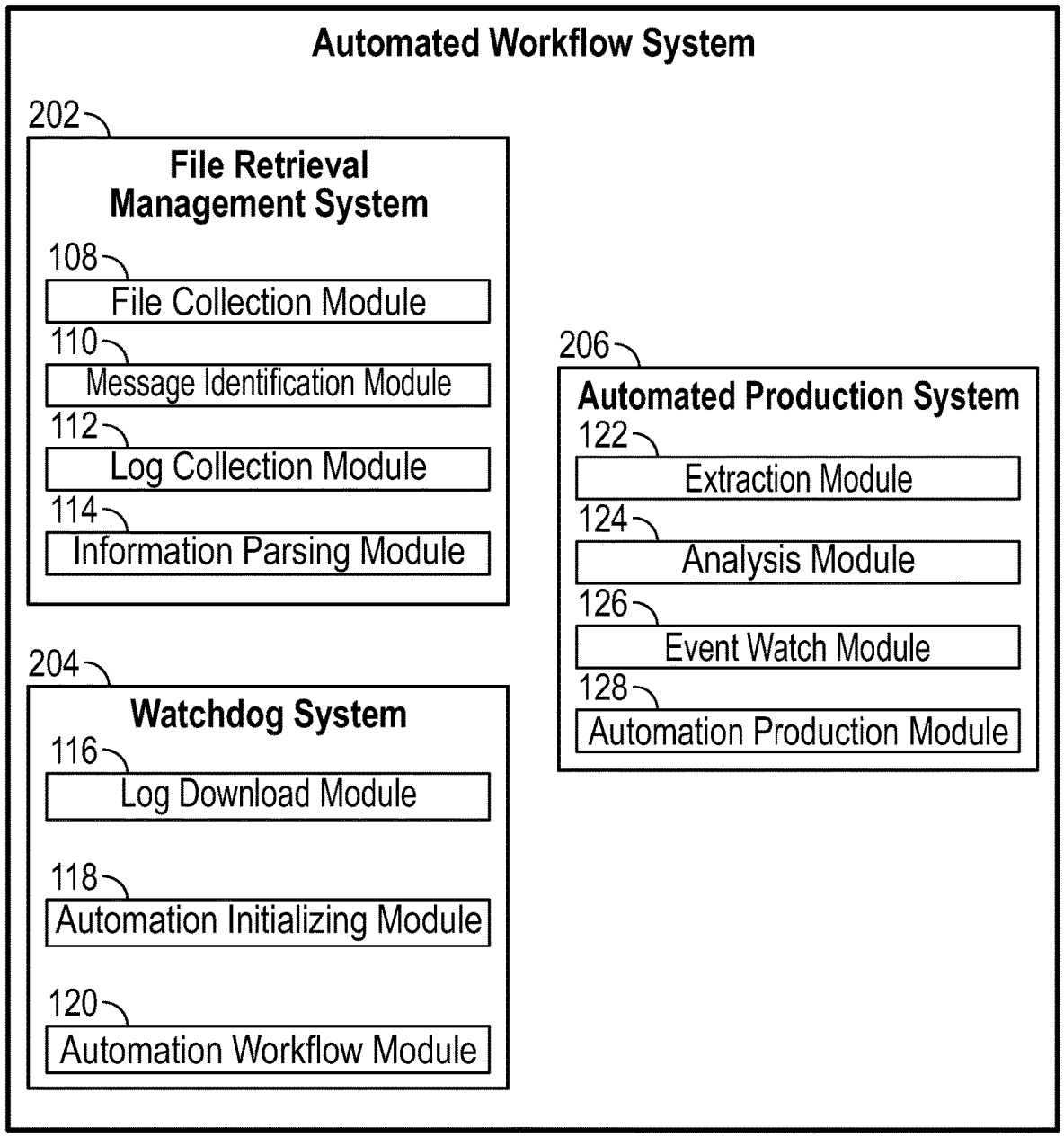
FIG. 2 illustrates a block diagram of an automated workflow system, in accordance with one or more embodiments of the present disclosure.

FIG. 2 illustrates a schematic view of an automated workflow system 200, in accordance with one or more embodiments of the present disclosure. The automated workflow system 200 can include a file retrieval management system 202, a watchdog system 204, and an automated production system 206. Although certain embodiments may be directed to identifying root causes of PTC brake events, the automated workflow system 200 can be used to automate workflow for identifying root causes for various types of events and systems such as policy enforcement events, repeat offender notifications, and authority notifications systems.

In one embodiment, the file retrieval management system 202 can include the file collection module 108, the message identification module 110, the log collection module 112, and the information parsing module 114. The file collection module 108, the file parsing module 110, the log collection module 112, and the information parsing module 114 can implement one or more algorithms to facilitate retrieval of files and logs of railroad events for various systems, including status, selection, and authentication algorithms. The algorithms and their associated thresholds and/or signatures can be programmable to suit a particular railroad events, application, function, facility, or other requirement. The file retrieval management system 202 can be configured to retrieve and modify files and logs related to one or more enforcement events or other suitable activity, to and from the client or server. In another embodiment, the file retrieval management system 202 can generate one or more elements for display on the user device. The elements can provide additional information related to the status of railroad event management. For example, notifications can be generated by the file retrieval management system 202 and displayed on the client to indicate file collections, log parsing, automated workflow initialization, railroad event handling, errors, or other suitable information. Additionally, system symbols can be displayed on the client to indicate task, inspection, or analysis status.

The file collection module 108 can receive incoming messages regarding railroad event notifications. For example, the railroad event notification can include enforcement events, such as a PTC brake event. In one embodiment, the file collection module 108 can receive the incoming messages from a file retrieval manager (FRM). For example, the incoming messages can correspond to one or more of the enforcement events. In another embodiment, the file collection module 108 can transmit outgoing messages to the FRM. For example, the outgoing messages can request system component logs corresponding to one or more of the enforcement events. In another embodiment, the file collection module 108 can receive a notification indicating the system component logs are available.

In another embodiment, the file collection module 108 can generate an authentication token for a particular user, session, or request. In another embodiment, the file collection module 108 can access the network 140 without user credentials. In another embodiment, the file collection module 108 can generate an authentication token using user data stored in the client. For example, a user can access a client and/or the automated workflow system 200 by providing valid credentials via a login page or screen, including a username and password, biometrics, multi-factor authentication, or other suitable credential, such credentials, along with a user's information such as name, username, employee number, etc., can be stored in the client or server. In another embodiment, the file collection module 108 can process at least a portion of the credentials and/or user information to generate an authentication token. For example, the authentication token can be generated as a JSON Web Token (JWT), via dongles or key fobs that can periodically generate a new authentication token in accordance with a known algorithm, using an authenticator app on the client or sent on demand via SMS, by hashing at least a portion of the login credentials, or other suitable methodology.

In another embodiment, the authentication token can allow for single sign-on authentication to the server and/or memory from the client. In another embodiment, the file collection module 108 can operate without a user interface. In another example, the file collection module 108 can provide a user interface for a user to access the file collection module 108. The automated workflow system 200 can utilize the file collection module 108 to provide a user interface for receiving relevant data.

The message identification module 110 can classify the incoming messages and the notification. In one embodiment, the message identification module 110 can receive information about an enforcement event from the incoming messages and the notification. For example, the message identification module 110 can classify the incoming messages as an enforcement message or a status request and classify the notification as a log status. In another embodiment, the message identification module 110 can identify the system component logs of an enforcement event. For example, the message identification module 110 can identify the characteristics of the enforcement event. In another example, the characteristics can include an event time, a primary CPU monitoring the train during the enforcement, an appropriate component software version, a high-level system health scan, among other relevant characteristics. In another example, the message identification module 110 can verify the incoming message to identify whether the enforcement event actually occurred based on at least one of the characteristics.

The log collection module 112 can receive the system component logs. In one embodiment, the system component logs are sent from the FRM. In another embodiment, the log collection module 112 can download the system component logs from an external memory. The system component logs can correspond to default set of onboard logs from at least one CPU on board the train. The system component logs can indicate characteristics of the enforcement of the brake event. In another embodiment, the log collection module 112 can store the system component logs for future access.

The information parsing module 114 can parse the incoming messages and the notification for relevant information. For example, the relevant information can include information about the enforcement event. In another example, the incoming messages can include information such as a user ID, the employee information on the train, the employee requesting the information, a location of the train, among other relevant information. In one embodiment, the information parsing module 114 can establish a connection to a database. For example, the information parsing module 114 can receive the incoming message from the database and transmit the relevant information to the database.

In one embodiment, the watchdog system 204 can include log download module 116, automation initializing module 118, automation workflow module 120. The log download module 116, automation initializing module 118, automation workflow module 120 can implement one or more algorithms to facilitate status monitoring of the system component logs, including a file fetching, event monitor, and service enable algorithm. The algorithms and their associated thresholds and/or signatures can be programmable to suit a particular railroad event monitoring system, application, function, facility, or other requirement. The watchdog system 204 can be configured to transmit and receive messages related to status monitoring or other suitable activity, to and from the client or server. In another embodiment, the watchdog system 204 can generate one or more elements for display on the client. The elements can provide additional information related to workflow automation. For example, a notification can be generated by the watchdog system 204 and displayed on the client to indicate a status update, system component log status, start of an automation service, or other suitable information. Additionally, system symbols can be displayed on the client to indicate management status.

In one embodiment, the log download module 116 can query an internal service queue. For example, the internal service queue can be located at an IP address. In another example, the log download module 116 can query the internal service queue at a specified frequency. In another example, the specified frequency can include a user-set value, or a scheduled frequency. In another example, the scheduled frequency can include an execution every six minutes. In another embodiment, the log download module 116 can determine whether the internal service queue includes a new enforcement message. For example, the control logic 500 can prompt the internal service queue to notify the log download module 116 of any updated enforcement messages. If the internal service queue lacks a new enforcement message, the control logic 500 proceeds to do nothing. If the internal service queue includes a new enforcement message, the log download module 116 proceeds to generate a record. For example, the record can include a collection of enforcement events based on enforcement messages from the internal service queue. In another example, the log download module 116 can store the record to a database. In another embodiment, the log download module 116 can parse a file retrieval system for system component logs corresponding to the new enforcement event. For example, the file retrieval system can include the FRM. In another example, the system component logs can include downloadable files.

In another embodiment, the log download module 116 can determine whether the system component logs are available. For example, the log download module 116 can determine whether the system component logs are available in the file retrieval system. In another example, the system component logs might not be generated at a time the log download module 116 checks, as the system component logs can lag. If the system component logs are unavailable, then the log download module 116 repeats the checking process after a period of time. For example, the period of time can be 49 hours. If the system component logs are available, then the log download module 116 proceeds to receive the system component logs. For example, the log download module 116 can receive the system component logs from the file retrieval system. In another example, the log download module 116 can receive the system component logs in a downloadable manner. In another example, the log download module 116 can receive the system component logs in a virtual manner, such as a cloud environment.

In another embodiment, the log download module 116 can update a status of the system component logs in the record. For example, the log download module 116 can update the record to indicate whether the system component logs were available or not. In an example, the log download module 116 can determine whether the system component logs include information for a plurality of CPUs on the train.

In one embodiment, the automation initializing module 118 can identify whether an automation service is executing. For example, the automation initialization module 122 can determine whether the automation service is executing on a designated server. In another example, the designated server can include a designated IP address. In another example, the automation initializing module 118 can determine whether the automation service is executing based on network traffic on the designated IP address, network traffic on the designated server, or another method. If the automation service is not currently executing, the automation initializing module 118 can proceed to execute the automation service. For example, the automation initialization module 122 can execute the automation service by executing initialization instructions for the automation service. If the automation service is currently executing, the automation initializing module 118 can proceed to execute an automation process. For example, the automation process can include algorithms, applications, and functions from the automated production system 206. In another example, the algorithms, applications, and functions can include one or more of the extraction modules 122, the analysis module 124, the event watch module 126, and the automation production module 128. In another example, the automation initializing module 118 can execute the automation process by executing initialization instructions for the automation process.

The automation workflow module 120 can receive processed events. For example, the processed events can include results from the automated process. In another example, the processed events can include a root cause of the enforcement event. In another example, the automation workflow module 120 can receive the processed events from the designated server. In another example, the automation workflow module 120 can store the processed events to an automation production server. In one embodiment, the automation workflow module 120 can generate a notification when the automation process is complete. For example, the notification can correspond to a result of the processed events. In another example, the automation workflow module 120 generates the notification for a group of stakeholders of the processed events. In another example, the automation workflow module 120 transmits the notification to the stakeholders via email. In an embodiment, the automation workflow module 120 can transmit event files to a completed directory. For example, the event files can include information regarding the processed events. In another example, the completed directory can include a file server specific to the processed events.

In one embodiment, the automated production system 206 can include the extraction module 122, the analysis module 124, the event watch module 126, and the automation production module 128. The extraction module 122, analysis module 124, event watch module 126, and automation production module 128 can implement one or more algorithms to facilitate automated workflow and identify a root cause of a train event, including an extraction, analysis monitor, and event watch algorithm. The algorithms and their associated thresholds and/or signatures can be programmable to suit a particular railroad event monitoring system, application, function, facility, or other requirement. The automated production system 206 can be configured to transmit and receive messages related to workflow automation or other suitable activity, to and from the client or server. In another embodiment, the automated production system 206 can generate one or more elements for display on the user device. The elements can provide additional information related to root cause analysis. For example, a notification can be generated by the automated production system 206 and displayed on the client to indicate a root cause is identified, system component logs extracted, event monitoring, or other suitable information. Additionally, system symbols can be displayed on the client to indicate an event status, analysis completion, or root cause identified.

In one embodiment, the extraction module 122 can receive data from a file server. For example, the data can correspond to system component logs including characteristics of an enforcement event. In another example, the file server can include system component logs from a plurality of enforcement events. In another embodiment, the extraction module 122 can collect data points surrounding a time of the enforcement event to generate a time window. For example, the data points can correspond with the system component logs. In another example, the time window can include time measurements before the enforcement event, after the enforcement event, or both before and after the enforcement event. In another example, the time window can include seconds, minutes, or hours relating to the enforcement event. In another example, the extraction module 122 can compare the time of the enforcement with the data points to verify the enforcement event actually occurred.

In another embodiment, the extraction module 122 can label the data with unique identifiers. For example, the extraction module 122 can label the system component logs based on the characteristics. In another embodiment, the extraction module 122 can determine whether the data is structured. For example, the data is structured when information in the data is classified according to a predetermined manner. In another example, the data is unstructured when the information in the data is classified differently than the predetermined manner or unclassified entirely. In another embodiment, when the data is unstructured, the extraction module 122 can identify a pattern to the unstructured data to transform the data into structured data and extract the data. For example, the extraction module 122 can transform the unstructured data into structured data using a data transformation software tool. In another embodiment, when the data is structured, the extraction module 122 can extract the data. In another example, the extraction module 122 can extract data using regular expression. In another example, the regular expressions can include a sequence of characters that define a search pattern. In another example, the extraction module 122 can extract data using data manipulation techniques. In another example, the data manipulation techniques can include using commercial software tools such as HADOOP or developing custom data tools in various programming language. In another embodiment, the extraction module 122 transmits the extracted data to the analysis module 124.

In one embodiment, the analysis module 124 can analyze the extracted data to generate an analysis result. For example, the analysis result can include whether the analysis module 124 determined a root cause. In another example, the analysis module 124 can include a plurality of decision steps to determine whether the root cause is established. In another embodiment, the analysis module 124 can analyze the extracted data using a defect detection analysis model. For example, the defect detection analysis model can identify when a defect during the analysis occurs. In another example, when the defect occurs, the analysis module 124 can classify the defect as the root cause. In another example, when the defect does not occur, the analysis module 124 can analyze the extracted data using a historical analysis model. In another example, the historical analysis model is based on historical data such as previous engineer interactions, system component responses, and situational behavior. In another example, the analysis module 124 can analyze the extracted data using a decision tree model, a classification model, or a clustering model. In an embodiment, the analysis module 124, the event watch module 126, and the automation production module 128 can form an analysis model.

In an embodiment, one or more analysis thresholds can determine whether the automated workflow system 206 performs a single analysis model or multiple analysis models. This adaptive analysis thresholding can alter one or more characteristics of the database. Additionally, the analysis thresholds are adaptive as the thresholding can change based upon the historical data, data type, timestamp, or other relevant data. For example, the system can compare a first accuracy of an output from a first analysis model to a preset analysis threshold. The preset analysis threshold can include a user-defined accuracy value. So, as the first analysis model outputs a first root cause of a penalty event, the system can verify whether the first root cause is a cause of the penalty event. In an example, when the first accuracy of the first root cause is below the preset analysis threshold, the system continues with a second analysis model.

By way of further example, when the second analysis model executes, the second analysis model compares historical data with the penalty event. The historical data can include data about a particular locomotive, a fleet of locomotives, user-defined inputs, or some other data associated to penalty events. If the system identifies a match between the historical data and the penalty event, the system outputs a second root cause of the penalty event based on the historical data. The second root cause corresponds with a second accuracy. The system can compare the first accuracy of the first root cause with the second root cause to determine whether the two root causes are the same or different.

In another exemplary embodiment, the system can provide analysis thresholding when comparing the first accuracy and the second accuracy. For example, the system can compare the two accuracies based on subsequent measures of accuracy. The system can initially compare the two root causes for similarities, and when the two root causes are the same, the system can conclude the similar root cause is a cause of the penalty event. Upon initial measurement, when one of the accuracies is above an analysis threshold, the accuracy above the analysis threshold can correspond with a root cause of the penalty event. In an event when both accuracies are above the analysis threshold, the system can compare the two root causes for similarities. If the two root causes are the same, then the system determines the similar root cause is the cause of the penalty event. If the two root causes are different, then the system can execute another round of comparison. The second round of comparison can include various forms of tie breaking such as higher accuracy measurement, user-intervention, rerunning the analysis, or some other form of determining the root cause.

In one embodiment, the event watch module 126 can receive the analysis result from the analysis module 124. In an embodiment, when the analysis result does not include the root cause, the event watch module 126 can generate a high-level classification for the enforcement event and assign a unique ID to the analysis result. For example, the high-level classification can include a message type, a message description, and a banner. In another example, the message type can be a warning to the train prior to an enforcement event. In another example, the message description can include a description of the warning including information such as the enforcement event. In another example, the banner can be the last banner shown to the engineer prior to the enforcement event. In another embodiment, when the analysis result includes the root cause, the event watch module 126 can assign an alert ID to the analysis result.

In one embodiment, the automation production module 128 can transmit a detailed synopsis to a user. For example, the detailed synopsis can include a plurality of events such as a time that a train was active, a speed of the train during the enforcement of the train event, location details of the train, warnings to the train, configuration details of the train, PTC component information, a type of the enforcement, and a type of braking event. In another example, the detailed synopsis can correspond to the unique ID or the alert ID. In another example, the automation production module 128 can transmit the detailed synopsis through an AES. In another example, the AES can include a listserv of applicable users to be notified. In another embodiment, the automation production module 128 can generate an output and distribute a notification to users based on a user list.

Figure 3:
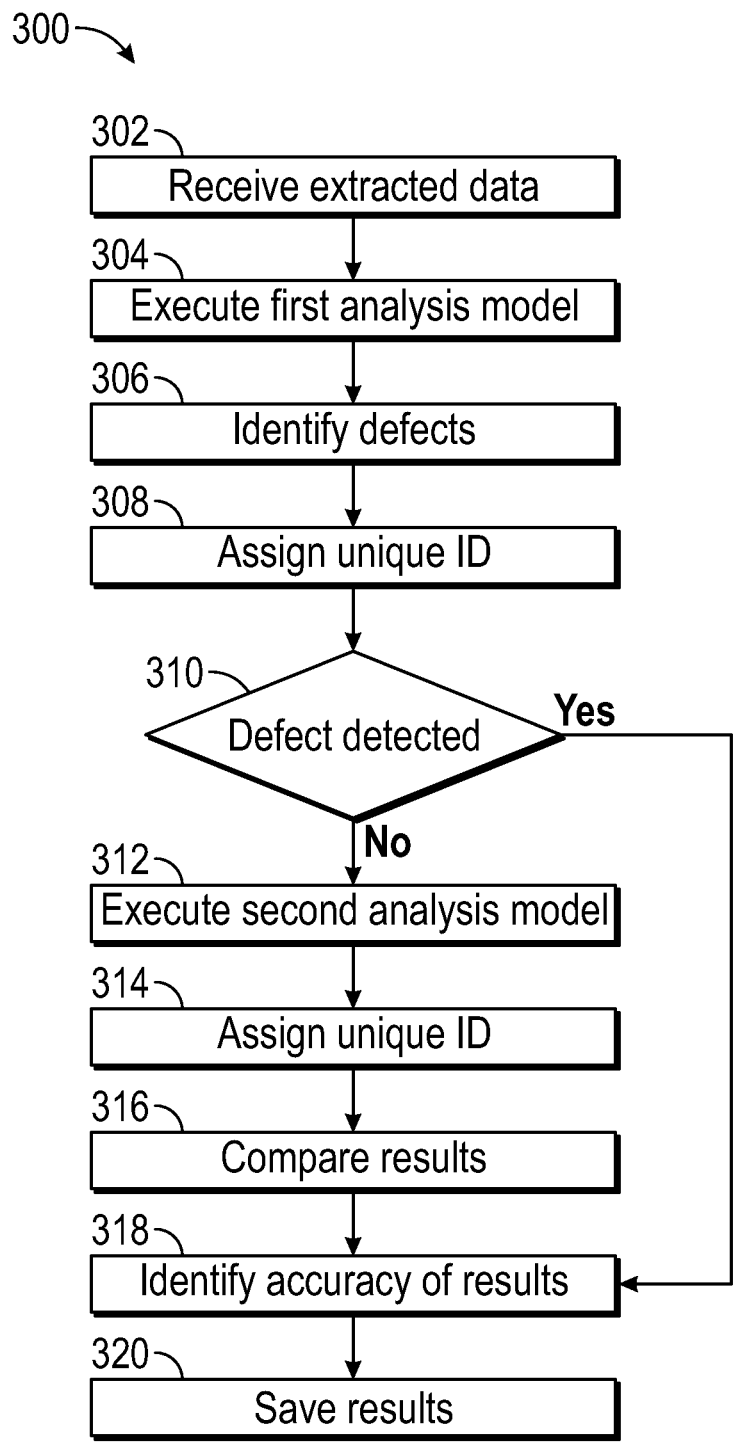
FIG. 3 illustrates a flowchart of an analysis model control logic, in accordance with one or more exemplary embodiments of the present disclosure.

FIG. 3 illustrates a flowchart exemplifying analysis model control logic 300, in accordance with one or more exemplary embodiments of the present disclosure. The analysis model control logic 300 can be implemented as an algorithm on a server 102, a machine learning module, a client, a database, or other suitable system. Additionally, the analysis model control logic 300 can implement or incorporate one or more features of the automated production system 206, including extraction module 122, analysis module 124, event watch module 126, and automation production module 128. The analysis model control logic 300 can be achieved with software, hardware, an API, a network connection, a network transfer protocol, HTML, DHTML, JavaScript, Dojo, Ruby, Rails, other suitable applications, or a suitable combination thereof.

The analysis model control logic 300 can leverage the ability of a computer platform to spawn multiple processes and threads by processing data simultaneously. The speed and efficiency of the analysis model control logic 300 can be greatly improved by instantiating more than one process to implement analysis model. However, one skilled in the art of programming will appreciate that use of a single processing thread may also be utilized and is within the scope of the present disclosure.

In one embodiment, commands or data can be received via user input generated on a client or server, such as a screen tap, swipe, mouse click, key press, voice command, or other suitable mechanism. In another embodiment, the inspection commands or data can include inspection data having one or more fields, parameters, characteristics, or metadata, related to an inspection. The analysis model control logic 300 then proceeds to step 302.

At step 302, in one embodiment, the control logic 300 can receive extracted data. For example, the extracted data can correspond to system component logs including characteristics of an enforcement event. In another embodiment, the extracted data can include data points surrounding a time of the enforcement event to generate a time window. For example, the data points can correspond with the system component logs. In another example, the time window can include time measurements before the enforcement event, after the enforcement event, or both before and after the enforcement event. In another example, the time window can include seconds, minutes, or hours relating to the enforcement event. In another embodiment, the extracted data can include labels with unique identifiers. For example, the extracted data can include labels corresponding to the system component logs based on the characteristics. In another embodiment, the extracted data can include structured data. For example, the data is structured when information in the data is classified according to a predetermined manner. The control logic 300 proceeds to step 304.

At step 304, in one embodiment, the control logic 300 can execute a first analysis model. For example, the control logic 300 can execute the first analysis model to obtain a first result. In another example, the first result can include whether the extracted data includes a root cause. In another example, the first analysis model can include a plurality of decision steps to determine whether the extracted data includes the root cause. For example, the decision steps can include a plurality of decisions corresponding to a particular environment. In an example, the particular environment can include a railroad event management system incorporating a railroad safety policy. In another example, the railroad safety policy can include the plurality of steps such as determining whether a brake signal stops, a quality of the signal, a distance of a locomotive to a target value, a speed of the locomotive, a lag time of the signal from the locomotive, a network quality indicator, a location of the locomotive, among other relevant safety factors.

In another example, the first analysis model can analyze the extracted data using a decision tree model, a classification model, a clustering model, a machine learning model, or another type of data analysis model. In an example, the first analysis model can execute natural language processing (NLP) to analyze the extracted data to identify key words to indicate the root cause. In an example, when the first analysis model is the machine learning model, the first analysis model can train the machine learning model on historic data representing safety conditions described by the railroad safety policy. In another example, the machine learning model can test accuracy based on real-time data corresponding to at least one locomotive. In another example, the machine learning model can include a deep learning model, a recurrent neural network, artificial neural network, or another type of machine learning model not limited to the foregoing. In another example, the machine learning model can execute the first analysis on a cloud-based environment. For example, the machine learning model can execute as a software-as-a-service (SaaS), platform-as-a-service (PaaS), an infrastructure-as-a-service (IaaS), or another relevant software-based environment. The control logic 300 proceeds to step 306.

At step 306, in one embodiment, the control logic 300 can identify defects in the extracted data. For example, the first analysis model can analyze the extracted data using a decision tree model identifying the extracted data that fails at least one decision tree node. The control logic 300 proceeds to step 308.

At step 308, in one embodiment, the control logic 300 can assign a unique ID to the results of the analysis model. For example, the unique ID can include a globally unique ID (GUID). The control logic 300 proceeds to step 310.

At step 310, in one embodiment, the control logic 300 can determine whether the defect exists in the first result. In another example, the defect detection analysis model can identify when a defect occurs during execution of the first analysis model. In another example, when the defect occurs, the first result can classify the defect as the root cause. If the defect exists in the results, the control logic 300 proceeds to step 318. If the defect does not exist in the results, the control logic 300 proceeds to step 312.

At step 312, in one embodiment, the control logic 300 can execute a second analysis model on the extracted data. For example, when the defect does not occur, the control logic 300 can analyze the extracted data using a historical analysis model. In another example, the historical analysis model is based on historical data such as previous engineer interactions, system component responses, and situational behavior. In another example, the control logic 300 can execute the second analysis model on the extracted data to generate a second result. For example, the control logic 300 can compare the second result to the historic data to determine an accuracy of the second result. The control logic 300 proceeds to step 314.

At step 314, in one embodiment, the control logic 300 can assign another unique ID to the results of the second analysis model. For example, the unique ID can include another GUID. The control logic 300 proceeds to step 316.

At step 316, in one embodiment, the control logic 300 can compare the results from the first analysis model and the second analysis model to determine the root cause. For example, the control logic 300 can compare the first result and the second result to identify the root cause based on a user input. In an example, the user input can include a decision between the first result and the second result. The control logic 300 proceeds to step 318.

At step 318, in one embodiment, the control logic 300 can identify an accuracy of the results. In another example, the control logic 300 can compare the first result and the second result to determine a most accurate cause as the root cause bas. For example, the control logic 300 can assign weights to the first analysis model and the second analysis model in response to known accuracies of the first analysis model and the second analysis model. The control logic 300 proceeds to step 320.

At step 320, in one embodiment, the control logic 300 can save the first result, the first unique ID, the second result, and the second unique ID. For example, the control logic 300 can save the results and the unique IDs in a database according to the enforcement event corresponding to the extracted data.

Figure 4A:
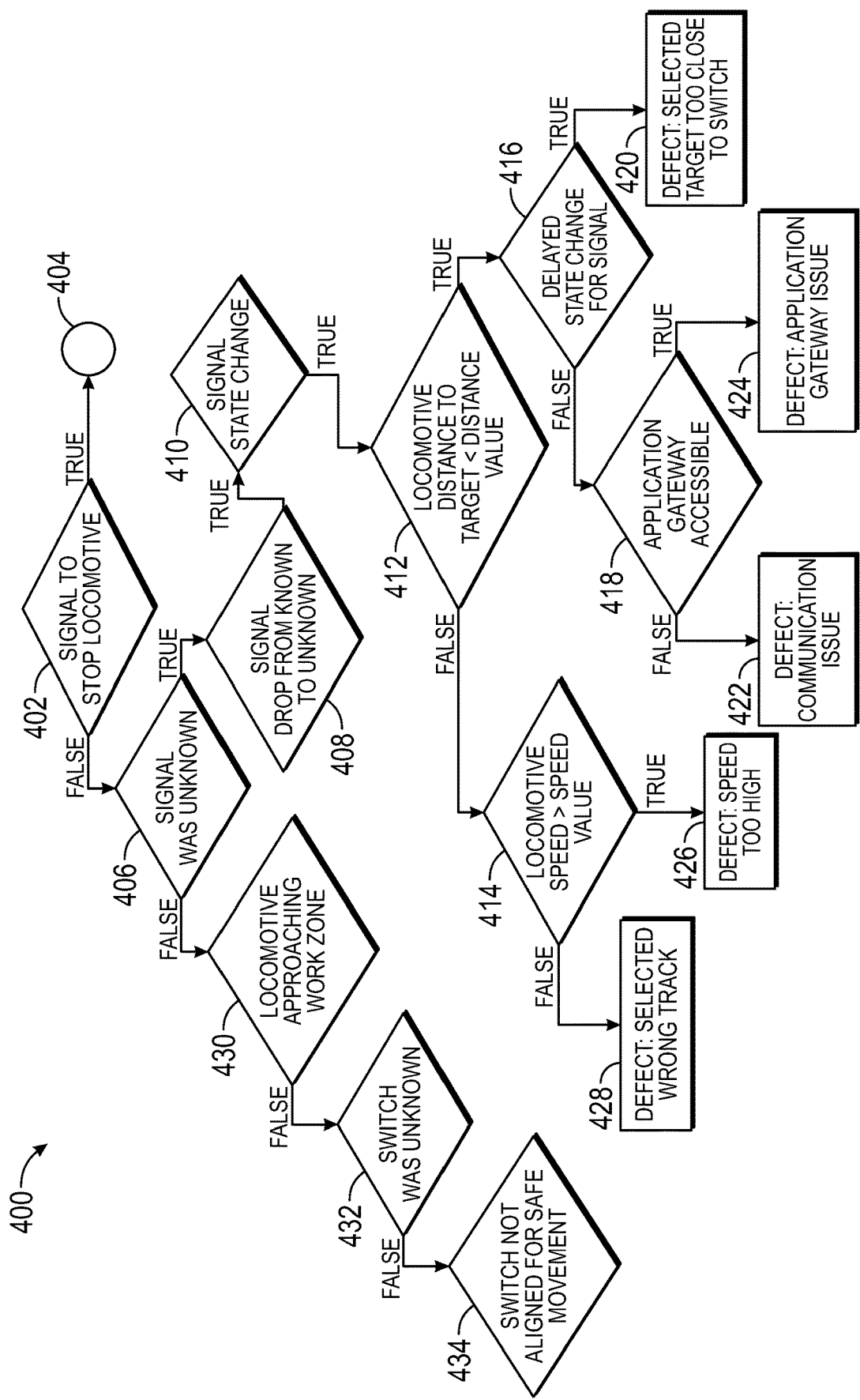
FIG. 4A illustrates an analysis decision tree control logic, in accordance with one or more exemplary embodiments of the present disclosure.

FIG. 4A illustrates a flowchart exemplifying analysis decision tree control logic 400, in accordance with one or more exemplary embodiments of the present disclosure. The analysis decision tree control logic 400 can be implemented as an algorithm on a server 102, a machine learning module, a client, a database, or other suitable system. Additionally, the analysis model control logic 300 can implement or incorporate one or more features of the automated production system 206, including extraction module 122, analysis module 124, event watch module 126, and automation production module 128. The analysis decision tree control logic 400 can be achieved with software, hardware, an API, a network connection, a network transfer protocol, HTML, DHTML, JavaScript, Dojo, Ruby, Rails, other suitable applications, or a suitable combination thereof.

The analysis decision tree control logic 400 can leverage the ability of a computer platform to spawn multiple processes and threads by processing data simultaneously. The speed and efficiency of the analysis decision tree control logic 400 can be greatly improved by instantiating more than one process to implement an analysis decision tree control logic. However, one skilled in the art of programming will appreciate that use of a single processing thread may also be utilized and is within the scope of the present disclosure.

In one embodiment, commands or data can be received via user input generated on a client or server, such as a screen tap, swipe, mouse click, key press, voice command, or other suitable mechanism. In another embodiment, the inspection commands or data can include inspection data having one or more fields, parameters, characteristics, or metadata, related to an inspection. The analysis decision tree control logic 400 then proceeds to step 402.

At step 402, in one embodiment, the control logic 400 can determine whether a signal required a locomotive to stop based on extracted data. For example, the signal can correspond to communication between the locomotive and at least one network node in response to an enforcement event. In an example, the extracted data can include information and parameters corresponding to the signal and the enforcement event, such as a PTC brake event. In an example, the extracted data can correspond to system log components of the enforcement event. In another example, the control logic 400 can identify the characteristics of the enforcement event. For example, the characteristics can include an event time, a primary CPU monitoring the train during the enforcement, an appropriate component software version, a high-level system health scan, among other relevant characteristics. In another example, the control logic 400 can receive the signal from a file retrieval manager (FRM). If the signal requires the locomotive to stop, the control logic 400 proceeds to step 404. If the signal does not require the locomotive to stop, the control logic 400 proceeds to step 406.

Figure 4B:
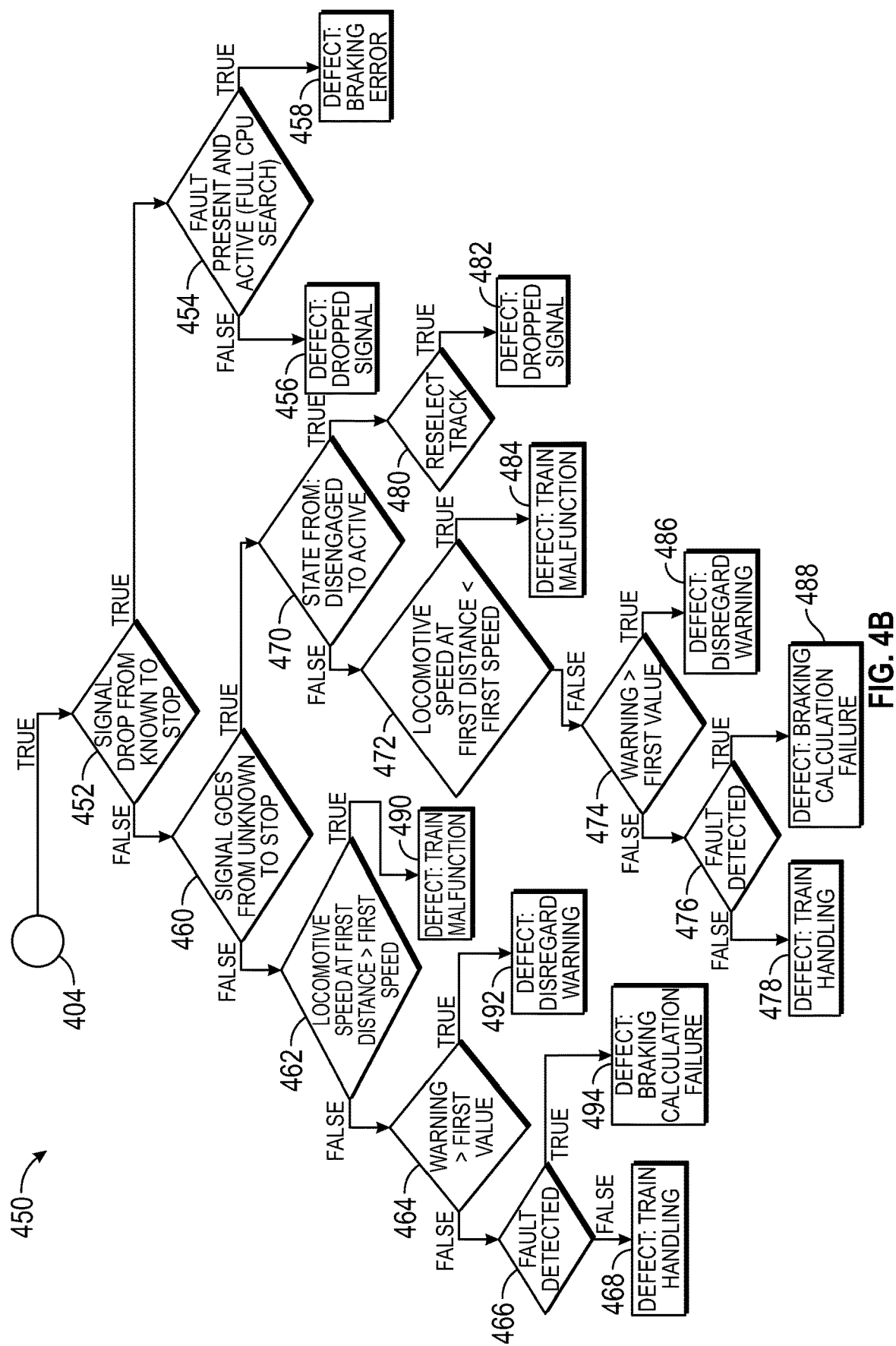
FIG. 4B illustrates an analysis decision tree control logic, in accordance with one or more exemplary embodiments of the present disclosure.

At step 404, in one embodiment, the control logic 400 can execute a decision tree branch corresponding to the signal to stop the locomotive, as described in more detail in FIG. 4B.

At step 406, in one embodiment, the control logic 400 can determine whether the signal was unknown based on the extracted data. For example, the extracted data can include a list of historic signal values to determine how the signal changed over time. In an example, the control logic 400 can compare the signal to a plurality of known signals of the historic statuses to identify whether the signal matches any of the known signals. In another example, the control logic 400 can determine a status of the signal at any time before the enforcement event. If the signal is unknown, the control logic 400 proceeds to step 408. If the signal is known, the control logic 400 proceeds to step 430.

At step 408, in one embodiment, the control logic 400 can determine whether the signal changed from a known value to an unknown value based on the extracted data. For example, the extracted data can include a list of historic signal values to determine whether the signal changed over time. In an example, the control logic 400 can compare the signal to the list of historic signal values to identify whether the signal changed from the known value to the unknown value. In another example, the control logic 400 can determine a status of the signal at any time before the enforcement event. If the signal changed from the known value to the unknown value, the control logic 400 proceeds to step 410. If the signal did not change from the known value to the unknown value, the control logic 400 does not detect a defect and the decision tree terminates.

At step 410, in one embodiment, the control logic 400 can determine whether a state of the signal changed based on the extracted data. For example, the extracted data can include information corresponding to a list of historic states to determine whether the state of the signal changed. In an example, the control logic 400 can compare the list of historic states to the state of the signal to determine whether the state changed. If the state of the signal changed, the control logic 400 proceeds to step 412. If the state of the signal did not change, the control logic 400 does not detect a defect and the decision tree terminates.

At step 412, in one embodiment, the control logic 400 can determine whether a distance between the locomotive and a target location is less than a predetermined distance based on the extracted data. For example, the extracted data can include distance information about a location of the locomotive. In an example, the predetermined distance can include a user-defined distance, a calculated distance based on a safety protocol, or another measurement. In another example, the control logic 400 can compare the distance between the locomotive and the target location to determine whether the distance between the locomotive and the target location was less than the predetermined distance at a time before or during the enforcement event. If the distance between the locomotive and the target location was less than the predetermined distance, the control logic 400 proceeds to step 416. If the distance between the locomotive and the target location was greater than the predetermined distance, the control logic 400 proceeds to step 414.

At step 414, in one embodiment, the control logic 400 can determine whether a speed of the locomotive is greater than a predetermined speed based on the extracted data. For example, the extracted data can include speed information about the locomotive. In another example, the predetermined speed can include a user-defined value, a calculated speed based on a safety protocol, or another measurement. In another example, the control logic 400 can compare the speed of the locomotive with the predetermined speed to determine whether the speed of the locomotive was greater than the predetermined speed at a time before or during the enforcement event. If the speed of the locomotive was greater than the predetermined speed, the control logic 400 proceeds to step 426. If the speed of the locomotive was less than the predetermined speed, the control logic 400 proceeds to step 428.

At step 416, in one embodiment, the control logic 400 can determine whether a state change of the signal was delayed based on the extracted data. For example, the extracted data can include information corresponding to a list of historic states to determine whether the state of the signal changed. In an example, the control logic 400 can compare the list of historic states to the state of the signal to determine whether the state changed. In another example, the state change of the signal can include a signal change from a known value to an unknown value, a known value to another known value, an unknown value to a known value, or any other combination of values to indication the state change. In an example, the state change can be delayed based on poor communication quality between the locomotive and the at least one network node, hardware or software malfunction of the locomotive or the at least one network node, or another delay reason. If the state change of the signal was delayed, the control logic 400 proceeds to step 420. If the state change of the signal was not delayed, the control logic 400 proceeds to step 418.

At step 418, in one embodiment, the control logic 400 can determine whether an application gateway was accessible based on the extracted data. For example, the extracted data can include network information between the locomotive and at least one network node corresponding to the application gateway. In another example, the extracted data can include a status of the application gateway indicating whether the application gateway was accessible during the enforcement event. In an example, the application gateway can include a particular IP address identifying the application gateway. In another example, the control logic 400 can identify accessibility of the application gateway at a time before or during the enforcement event to determine whether the application gateway was accessible. If the application gateway was accessible, the control logic 400 proceeds to step 424. If the application gateway was not accessible, the control logic 400 proceeds to step 422.

At step 420, in one embodiment, the control logic 400 can classify, based on the extracted data, the defect to be the locomotive selected a train track that was too close to a switch. For example, the extracted data can include travel information corresponding to the locomotive. In an example, the locomotive can select a particular route of train tracks to travel. The train tracks include areas including at least one switch. The at least one switch is an installation enabling trains to be guided from one track to another, such as at a railway junction. In an example, the control logic 400 can compare a predetermined path with the particular route of the train tracks to determine whether the train track selection was too close to the switch. When the locomotive selected the train track that is too close to the switch, the enforcement event is activated.

At step 422, in one embodiment, the control logic 400 can classify, based on the extracted data, the defect to be a communication issue between the locomotive and the at least one network node. For example, the extracted data can include network information between the locomotive and the at least one network node. In an example, the locomotive can communicate with the at least one network node while traveling. For example, the locomotive can communicate using any variety of communication methods, such as a wireless communication system following standard communication protocols (e.g., TCP/IP, MAC, HTTP, etc.). In another example, the control logic 400 can determine the communication issue between the locomotive and the at least one network node. When the communication issue exists, the enforcement event is activated.

At step 424, in one embodiment, the control logic 400 can classify, based on the extracted data, the defect to be an application gateway issue causing communication delays between the locomotive and the at least one network node. For example, the extracted data can include network information between the locomotive and the at least one network node. In an example, the locomotive can communicate with the at least one network node while traveling. The locomotive can communicate using any variety of communication methods, such as a wireless communication system following standard communication protocols (e.g., TCP/IP, MAC, HTTP, etc.). In another example, the control logic 400 can determine the application gateway issue between the locomotive and the at least one network node. When the signal cannot establish a connection with the application gateway and the application gateway is nonfunctional, the enforcement event is activated.

At step 426, in one embodiment, the control logic 400 can classify, based on the extracted data, the defect to be a speed of the locomotive is greater than a predetermined speed. For example, the extracted data can include speed information about the locomotive. In another example, the predetermined speed can include a user-defined value, a calculated speed based on a safety protocol, or another measurement. In another example, the control logic 400 can compare the speed of the locomotive with the predetermined speed to determine whether the speed of the locomotive was greater than the predetermined speed at a time before or during the enforcement event. When the speed of the locomotive was greater than the predetermined speed, the enforcement event is activated.

At step 428, in one embodiment, the control logic 400 can classify, based on the extracted data, the defect to be the locomotive selected an incorrect track. For example, the extracted data can include a proposed route for the locomotive. In an example, the locomotive can select tracks along a travel route. For example, the locomotive can select one track over another for convenience of traveling, rapid travel time, or some other reason. In an example, the locomotive can select the incorrect track along the travel route. In an example, the control logic 400 can compare the proposed route with the travel route to determine whether the locomotive selected the incorrect track. When the locomotive selects the incorrect track, the enforcement event is activated.

At step 430, in one embodiment, the control logic 400 can determine whether the locomotive was approaching a workzone. For example, the extracted data can include location information identifying the workzone. In an example, when the locomotive travels near the workzone, the locomotive can travel based on safety conditions. For example, the locomotive can travel at a lower speed, on a path farthest away from the workzone, or another method to handle approaching the workzone. In an example, the control logic 400 can compare locations of the locomotive with the workzone to determine whether the locomotive was approaching the workzone. If the locomotive was approaching the workzone, the control logic 400 determines that no defect is detected. If the locomotive was not approaching the workzone, the control logic 400 proceeds to step 432.

At step 432, in one embodiment, the control logic 400 can determine whether the locomotive traveled using an unknown switch based on the extracted data. For example, the extracted data can include track information for the locomotive indicating a plurality of switches on a route. In an example, the locomotive can select a particular route of train tracks to travel. For example, the train tracks include areas including at least one switch guiding the locomotive from one track to another, such as at a railway junction. In an example, the control logic 400 can compare the plurality of switches with the unknown switch to determine whether the locomotive traveled on the unknown switch. If the locomotive selects an unknown switch, the control logic 400 determines that no defect is detected. If the locomotive selects a known switch, the control logic 400 proceeds to step 434.

At step 434, in one embodiment, the control logic 400 can determine whether a switch on a route is not aligned for safe movement based on the extracted data. For example, the extracted data can include track information corresponding to the locomotive indicating a plurality of switches on a route. In an example, the locomotive can select a particular route of train tracks to travel. For example, the train tracks include areas including at least one switch guiding the locomotive from one track to another, such as at a railway junction. In an example, the control logic 400 can compare the switch on the route with a normal switch to identify whether the switch is not aligned for safe movement. If the switch is not aligned for safe movement, the control logic 400 determines that no defect is detected. If the switch is aligned for safe movement, the control logic 400 determines that no defect is detected.

FIG. 4B illustrates a flowchart exemplifying analysis decision tree control logic 450, in accordance with one or more exemplary embodiments of the present disclosure. The analysis decision tree control logic 450 can be implemented as an algorithm on a server 102, a machine learning module, a client, a database, or other suitable system. Additionally, the analysis model control logic 300 can implement or incorporate one or more features of the automated production system 206, including extraction module 122, analysis module 124, event watch module 126, and automation production module 128. The analysis decision tree control logic 450 can be achieved with software, hardware, an API, a network connection, a network transfer protocol, HTML, DHTML, JavaScript, Dojo, Ruby, Rails, other suitable applications, or a suitable combination thereof.

The analysis decision tree control logic 450 can leverage the ability of a computer platform to spawn multiple processes and threads by processing data simultaneously. The speed and efficiency of the analysis decision tree control logic 450 can be greatly improved by instantiating more than one process to implement analysis decision tree. However, one skilled in the art of programming will appreciate that use of a single processing thread may also be utilized and is within the scope of the present disclosure.

In one exemplary embodiment, commands or data can be received via user input generated on a client or server, such as a screen tap, swipe, mouse click, key press, voice command, or other suitable mechanism. In another exemplary embodiment, the inspection commands or data can include inspection data having one or more fields, parameters, characteristics, or metadata, related to an inspection. The analysis decision tree control logic 450 then proceeds to step 404.

At step 404, in one embodiment, the control logic 450 can execute a decision tree branch corresponding to a signal requiring a locomotive to stop based on extracted data. For example, the signal can correspond to communication between the locomotive and at least one network node in response to an enforcement event. In an example, the extracted data can include information and parameters corresponding to the signal and the enforcement event, such as a PTC brake event. In an example, the extracted data can correspond to system log components of the enforcement event. In another example, the control logic 450 can identify the characteristics of the enforcement event. For example, the characteristics can include an event time, a primary CPU monitoring the train during the enforcement, an appropriate component software version, a high-level system health scan, among other relevant characteristics. In another example, the control logic 450 can receive the signal from an FRM. The control logic 450 proceeds to step 452.

At step 452, in one embodiment, the control logic 450 can determine whether the signal changed from a known value to a stop instruction based on the extracted data. For example, the extracted data can include a list of historic signal values to determine whether the signal changed over time. In an example, the control logic 450 can compare the signal to the list of historic signal values to identify whether the signal changed from the known value to the unknown value. In another example, the control logic 450 can determine a status of the signal at any time before the enforcement event. If the signal changed from the known value to the stop instruction, the control logic 450 proceeds to step 454. If the signal did not change from the known value to the stop instruction, the control logic 450 proceeds to step 460.

At step 454, in one embodiment, the control logic 450 can determine whether a fault is present and active based on the extracted data. For example, the extracted data can include fault information about the enforcement event. In an example, the fault information can indicate whether the enforcement event was in response to one or more faults, such as a dropped signal or a braking error. In another example, the fault can be active when the fault persists after the enforcement event occurs. If the fault is present and active, the control logic 450 proceeds to step 458. If the fault is not present or active, the control logic 450 proceeds to step 456.

At step 456, in one embodiment, the control logic 450 can classify, based on the extracted data, the defect to be the signal was dropped. For example, the extracted data can include information indicating a status of the signal. In an example, the status of the signal can indicate a current status, previous status, historic status values, among other status indicators. In another example, the signal can be dropped in response to the locomotive failing to establish or maintain connection with one or more network elements. In an example, the control logic 450 can identify when the signal was dropped. When the signal is dropped, the enforcement event is activated.

At step 458, in one embodiment, the control logic 450 can classify, based on the extracted data, the defect to be a braking error. For example, the extracted data can include information indicating operability of a braking system on the locomotive. In an example, the braking error can occur based on an inability of the locomotive to apply the braking system. In another example, the control logic 450 can identify when the braking error occurs. When the braking error is present, the enforcement event is activated.

At step 460, in one embodiment, the control logic 450 can determine whether a status of the signal changed from an unknown value to a stop instruction based on the extracted data. For example, the extracted data can include information corresponding to a list of historic states to determine whether the state of the signal changed. In an example, the control logic 450 can compare the list of historic states to the state of the signal to determine whether the state changed. If the status of the signal changed from the unknown value to the stop instruction, the control logic 450 proceeds to step 470. If the status of the signal did not change from the unknown value to the stop instruction, the control logic 450 proceeds to step 462.

At step 462, in one embodiment, the control logic 450 can determine whether a speed of the locomotive at a distance away from a target was greater than a target speed based on the extracted data. For example, the extracted data can include speed information about the locomotive. In another example, the predetermined speed can include a user-defined value, a calculated speed based on a safety protocol, or another measurement. In another example, the control logic 450 can compare the speed of the locomotive with the predetermined speed to determine whether the speed of the locomotive was greater than the predetermined speed at a time before or during the enforcement event. If the speed of the locomotive at the distance away from the target is greater than the target speed, the control logic 450 proceeds to step 490. If the speed of the locomotive at the distance away from the target is less than the target speed, the control logic 450 proceeds to step 464.

At step 464, in one embodiment, the control logic 450 can determine whether a warning value was greater than a target warning value based on the extracted data. For example, the extracted data can include warnings the locomotive received corresponding to the enforcement event. In an example, the target warning value can correspond to the warnings the locomotive received. In another example, the warnings the locomotive received can include a warning to reduce locomotive speed, to change travel trajectory of the locomotive, to indicate poor communication quality, among other warnings. If the warning value is greater than the target warning value, the control logic 450 proceeds to step 492. If the warning value is less than the target warning value, the control logic 450 proceeds to step 466.

At step 466, in one embodiment, the control logic 450 can determine whether a fault is detected based on the extracted data. For example, the extracted data can include fault information about the enforcement event. In an example, the fault information can indicate whether the enforcement event was in response to one or more faults, such as improper train handling or braking calculation failure. If the fault was detected, the control logic 450 proceeds to step 494. If the fault was not detected, the control logic 450 proceeds to step 468.

At step 468, in one embodiment, the control logic 450 can classify, based on the extracted data, the defect to be improper handling of the locomotive. For example, the extracted data can include handling information of the locomotive. In an example, the handling information can include a quality value of how staff members on the locomotive handled occupational events. For example, the quality value can include a cumulative measure of handling occupational events, such as routine maintenance, inspection, or conducting of the locomotive, among other occupational events. In another example, the staff members can include resident engineers aboard the locomotive, a conductor of the locomotive, among other occupational members. In another example, the control logic 450 can compare the handling information with routine operation activity to determine whether the improper handling of the locomotive exists. When the locomotive is improperly handled, the enforcement event is activated.

At step 470, in one embodiment, the control logic 450 can determine whether a state of the locomotive changed from a disengaged state to an active state based on the extracted data. For example, the extracted data can include historic states of the locomotive to determine whether the state of the locomotive changes. In an example, the state of the locomotive can change in response to a travel status. For example, when the locomotive is moving, the travel status can indicate the state of the locomotive is the active state. Alternatively, when the locomotive is stationary, the travel status can indicate the state of the locomotive is the disengaged state. In another example, the control logic 450 can compare the state of the locomotive with the active state to determine whether the state of the locomotive changed. If the state of the locomotive changed from the disengaged state to the active state, the control logic 450 proceeds to step 480. If the state of the locomotive did not change from the disengaged state to the active state, the control logic 450 proceeds to step 472.

At step 472, in one embodiment, the control logic 450 can determine whether a speed of the locomotive at a distance away from a target was less than a target speed based on the extracted data. For example, the extracted data can include speed information about the locomotive. In another example, the predetermined speed can include a user-defined value, a calculated speed based on a safety protocol, or another measurement. In another example, the control logic 450 can compare the speed of the locomotive with the predetermined speed to determine whether the speed of the locomotive was greater than the predetermined speed at a time before or during the enforcement event. If the speed of the locomotive at the distance away from the target is less than the target speed, the control logic 450 proceeds to step 484. If the speed of the locomotive at the distance away from the target is greater than the target speed, the control logic 450 proceeds to step 474.

At step 474, in one embodiment, the control logic 450 can determine whether a warning value was greater than a target warning value based on the extracted data. For example, the extracted data can include warnings the locomotive received corresponding to the enforcement event. In an example, the target warning value can correspond to the warnings the locomotive received. In another example, the warnings the locomotive received can include a warning to reduce locomotive speed, to change travel trajectory of the locomotive, to indicate poor communication quality, among other warnings. In another example, the control logic 450 can compare the warning value with the target warning value to determine whether the warning value was greater than the target warning value. If the warning value was greater than the target warning value, the control logic 450 proceeds to step 486. If the warning value was less than the target warning value, the control logic 450 proceeds to step 476.

At step 476, in one embodiment, the control logic 450 can determine whether a fault is detected based on the extracted data. For example, the extracted data can include fault information about the enforcement event. In an example, the fault information can indicate whether the enforcement event was in response to one or more faults, such as improper train handling or braking calculation failure. If the fault was detected, the control logic 450 proceeds to step 488. If the fault was not detected, the control logic 450 proceeds to step 478.

At step 478, in one embodiment, the control logic 450 can classify, based on the extracted data, the defect to be improper handling of the locomotive. For example, the extracted data can include handling information of the locomotive. In an example, the handling information can include a quality value of how staff members on the locomotive handled occupational events. For example, the quality value can include a cumulative measure of handling occupational events, such as routine maintenance, inspection, or conducting of the locomotive, among other occupational events. In another example, the staff members can include resident engineers aboard the locomotive, a conductor of the locomotive, among other occupational members. In another example, the control logic 450 can compare the handling information with routine operation activity to determine whether the improper handling of the locomotive exists. When the locomotive was improperly handled, the enforcement event is activated.

At step 480, in one embodiment, the control logic 450 can determine whether the locomotive reselected a track based on the extracted data. For example, the extracted data includes track information to determine a travel path of the locomotive. In an example, the control logic 450 can determine whether the locomotive reselected the track in response to the locomotive altering the travel path. In an example, the travel path can include a predetermined path based on a starting point of the locomotive and an end point of the locomotive. In another example, the control logic 450 can compare the travel path of the locomotive with the predetermined path to determine whether the locomotive reselected the track. If the locomotive reselected the track, the control logic 450 proceeds to step 480. If the locomotive did not reselect the track, the control logic 450 determines that no defect is detected.

At step 482, in one embodiment, the control logic 450 can classify, based on the extracted data, the defect to be the signal was dropped. For example, the extracted data can include information indicating a status of the signal. In an example, the status of the signal can indicate a current status, previous status, historic status values, among other status indicators. In another example, the signal can be dropped in response to the locomotive failing to establish or maintain connection with one or more network elements. In another example, the control logic 450 can compare the signal to a normal signal to determine whether the signal was dropped. When the signal was dropped, the enforcement event is activated.

At step 484, in one embodiment, the control logic 450 can classify, based on the extracted data, the defect to be a malfunction of the locomotive. For example, the extracted data can include malfunction information corresponding to functions of the locomotive. In an example, the malfunction information can include operational ability of systems on, or part of the locomotive. For example, the systems on, or part of the locomotive can include mechanical systems, electrical systems, a combination of the mechanical systems and electrical systems, or another system. In another example, the control logic 450 can compare the malfunction information with normal operations to determine whether the malfunction exists. When the malfunction is present, the enforcement event is activated.

At step 486, in one embodiment, the control logic 450 can classify, based on the extracted data, the defect to be a disregarded warning. For example, the extracted data can include warning information corresponding to at least one warning received by the locomotive in response to the enforcement event. In an example, the warning information can indicate whether a staff member of the locomotive regarded the at least one warning. In another example, the control logic 450 can identify when the staff member disregarded the warning. When the disregarded warning is present, the enforcement event is activated.

At step 488, in one embodiment, the control logic 450 can classify, based on the extracted data, the defect to be a braking calculation failure. For example, the extracted data can include braking system information corresponding to the locomotive. In an example, the braking calculation failure can occur in response to the locomotive applying a braking system outside of a predetermined braking threshold. For example, the predetermined braking threshold can include a minimum distance the locomotive can apply the braking system to maintain a safe environment. In another example, the predetermined braking threshold can correspond to a calculated travel distance based on parameters of the locomotive. In another example, the control logic 450 can compare the braking system information with the predetermined braking threshold to determine whether the braking calculation failure exists. When the braking calculation failure is present, the enforcement event is activated.

At step 490, in one embodiment, the control logic 450 can classify, based on the extracted data, the defect to be a malfunction of the locomotive. For example, the extracted data can include malfunction information corresponding to functions of the locomotive. In an example, the malfunction information can include operational ability of systems on, or part of the locomotive. For example, the systems on, or part of the locomotive can include mechanical systems, electrical systems, a combination of the mechanical systems and electrical systems, or another system. In another example, the control logic 450 can compare the malfunction information with normal operations to determine whether the malfunction exists. When the malfunction is present, the enforcement event is activated.

At step 492, in one embodiment, the control logic 450 can classify, based on the extracted data, the defect to be a disregarded warning. For example, the extracted data can include warning information corresponding to at least one warning received by the locomotive in response to the enforcement event. In an example, the warning information can indicate whether a staff member of the locomotive regarded the at least one warning. In another example, the control logic 450 can identify when the staff member disregarded the warning. When the disregarded warning is present, the enforcement event is activated.

At step 494, in one embodiment, the control logic 450 can classify, based on the extracted data, the defect to be a braking calculation failure. For example, the extracted data can include braking system information corresponding to the locomotive. In an example, the braking calculation failure can occur in response to the locomotive applying a braking system outside of a predetermined braking threshold. For example, the predetermined braking threshold can include a minimum distance the locomotive can apply the braking system to maintain a safe environment. In another example, the predetermined braking threshold can correspond to a calculated travel distance based on parameters of the locomotive. In another example, the control logic 450 can compare the braking system information with the predetermined braking threshold to determine whether the braking calculation failure exists. When the braking calculation failure is present, the enforcement event is activated.

The present disclosure achieves at least the following advantages:

1. performs root cause analysis for various types of data structures using an automation engine;
2. increases efficiency of inspectors performing the root cause analysis by automating workflow;
3. enables accurate detection of train events such as PTC brake events and identifies the root cause of such events; and
4. provides an analytical framework to perform root cause analysis using data extraction and analysis models.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f).

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A system for performing root cause analysis of a positive train control (PTC) enforcement event, comprising:
    a memory having a database with system component logs for determining a root cause; and
    a networked computer processor operably coupled to the memory and capable of executing machine-readable instructions to perform program steps, the program steps comprising:
        determining, based on one or more conditions, to generate a PTC enforcement event in response to identifying one or more potential risks to a vehicle;
        initiating, based on the PTC enforcement event, a change in a speed of the vehicle to respond to the one or more potential risks;
        receiving extracted data, wherein receiving the extracted data includes:
            receiving an indication that the PTC enforcement event has occurred, the indication including a set of data related to the PTC enforcement event;
            clearing the PTC enforcement event for processing by conducting a health scan of the system to determine that the set of data related to the PTC enforcement event is reliable to perform analysis of the PTC enforcement event;
            selecting an extraction model based on a determination that the selected extraction model will yield a set of data points required for event analysis;
            applying the extraction model to extract data for event analysis; and
            receiving the extracted data, wherein the extracted data includes data associated with events related to the PTC enforcement event;
        executing a first analysis model using the extracted data to generate a first result and assigning a first unique ID to the first result;
        if a defect is detected in the first result based on the first analysis model, classifying the defect as a root cause of the PTC enforcement event;
        if a defect is not detected in the first result based on the first analysis model, executing a second analysis model using the extracted data to generate a second result, assigning a second unique ID to the second result, and comparing the first result with the second result to determine a most accurate result as the root cause of the PTC enforcement event, wherein comparing the first result with the second result includes comparing an accuracy of the first result to an accuracy of the second result to determine the most accurate result as the root cause of the PTC enforcement event;

generating a report to indicate the root cause of the PTC enforcement event; and storing the first result, the first unique ID, the second result, and the second unique ID.

2. The system of claim 1, wherein the first analysis model includes decision tree logic.

3. The system of claim 1, wherein the first analysis model includes a classification model.

4. The system of claim 1, wherein the first analysis model includes a clustering model.

5. The system of claim 1, wherein the second analysis model includes a historic analysis model based on historical data including previous engineer interactions, system component responses, and situational behavior.

6. The system of claim 1, wherein the first analysis model includes a machine learning algorithm or the second analysis model includes the machine learning algorithm.

7. The system of claim 1, wherein the program steps further comprise comparing the second result with historic classified data to determine an accuracy of the second result.

8. The system of claim 1, wherein the program steps further comprise determining a most accurate cause based on a user input.

9. A method of automating workflow and performing root cause analysis for a positive train control (PTC) enforcement event, comprising:

determining, based on one or more conditions, to generate a PTC enforcement event in response to identifying one or more potential risks to a vehicle;

initiating, based on the PTC enforcement event, a change in a speed of the vehicle to respond to the one or more potential risks;

receiving extracted data, wherein receiving the extracted data includes:

receiving an indication that the PTC enforcement event has occurred, the indication including a set of data related to the PTC enforcement event;

clearing the PTC enforcement event for processing by conducting a health scan of the system to determine that the set of data related to the PTC enforcement event is reliable to perform analysis of the PTC enforcement event;

selecting an extraction model based on a determination that the selected extraction model will yield a set of data points required for event analysis;

applying the extraction model to extract data for event analysis; and receiving the extracted data, wherein the extracted data includes data associated with events related to the PTC enforcement event;

executing a first analysis model using the extracted data to generate a first result and assigning a first unique ID to the first result;

if a defect is detected in the first result based on the first analysis model, classifying the defect as a root cause of the PTC enforcement event;

if a defect is not detected in the first result based on the first analysis model, executing a second analysis model using the extracted data to generate a second result, assigning a second unique ID to the second result, and comparing the first result with the second result to determine a most accurate result as the root cause of the PTC enforcement event, wherein comparing the first result with the second result includes comparing an accuracy of the first result to an accuracy of the second result to determine the most accurate result as the root cause of the PTC enforcement event;

generating a report to indicate the root cause of the PTC enforcement event; and storing the first result, the first unique ID, the second result, and the second unique ID.

10. The method of claim 9, wherein the first analysis model includes decision tree logic.

11. The method of claim 9, wherein the first analysis model includes a classification model.

12. The method of claim 9, wherein the first analysis model includes a clustering model.

13. The method of claim 9, wherein the second analysis model includes a historic analysis model based on historical data including previous engineer interactions, system component responses, and situational behavior.

14. The method of claim 9, wherein the first analysis model includes a machine learning algorithm or the second analysis model includes the machine learning algorithm.

15. The method of claim 9, wherein the program steps further comprise comparing the second result with historic classified data to determine an accuracy of the second result.

16. The method of claim 9, wherein the program steps further comprise determining a most accurate cause based on a user input.

17. A computer-implemented method for automating workflow and performing root cause analysis for a positive train control (PTC) enforcement event, comprising:

determining, based on one or more conditions, to generate a PTC enforcement event in response to identifying one or more potential risks to a vehicle;

initiating, based on the PTC enforcement event, a change in a speed of the vehicle to respond to the one or more potential risks;

receiving extracted data, wherein receiving the extracted data includes:

receiving an indication that the PTC enforcement event has occurred, the indication including a set of data related to the PTC enforcement event;

clearing the PTC enforcement event for processing by conducting a health scan of the system to determine that the set of data related to the PTC enforcement event is reliable to perform analysis of the PTC enforcement event;

selecting an extraction model based on a determination that the selected extraction model will yield a set of data points required for event analysis;

applying the extraction model to extract data for event analysis; and receiving the extracted data, wherein the extracted data includes data associated with events related to the PTC enforcement event;

executing a first analysis model using the extracted data to generate a first result and assigning a first unique ID to the first result;

if a defect is detected in the first result based on the first analysis model, classifying the defect as a root cause of the PTC enforcement event;

if a defect is not detected in the first result based on the first analysis model, executing a second analysis model using the extracted data to generate a second result, assigning a second unique ID to the second result, and comparing the first result with the second result to determine a most accurate result as the root cause of the PTC enforcement event, wherein comparing the first result with the second result includes comparing an accuracy of the first result to an accuracy of the second result to determine the most accurate result as the root cause of the PTC enforcement event;

generating a report to indicate the root cause of the PTC enforcement event; and storing the first result, the first unique ID, the second result, and the second unique ID.

18. The method of claim 17, wherein the first analysis model includes decision tree logic.

19. The method of claim 17, wherein the first analysis model includes a classification model.

20. The method of claim 17, wherein the first analysis model includes a clustering model.

21. The method of claim 17, wherein the second analysis model includes a historic analysis model based on historical data including previous engineer interactions, system component responses, and situational behavior.

22. The method of claim 17, wherein the first analysis model includes a machine learning algorithm or the second analysis model includes the machine learning algorithm.

23. The method of claim 17, wherein the program steps further comprise comparing the second result with historic classified data to determine an accuracy of the second result.

24. The method of claim 17, wherein the program steps further comprise determining a most accurate cause based on a user input.

* * * * *